Dec. 3, 1963  D. McINTYRE  3,112,636
TRAILER HITCH LOCKING MEANS
Filed Oct. 11, 1962
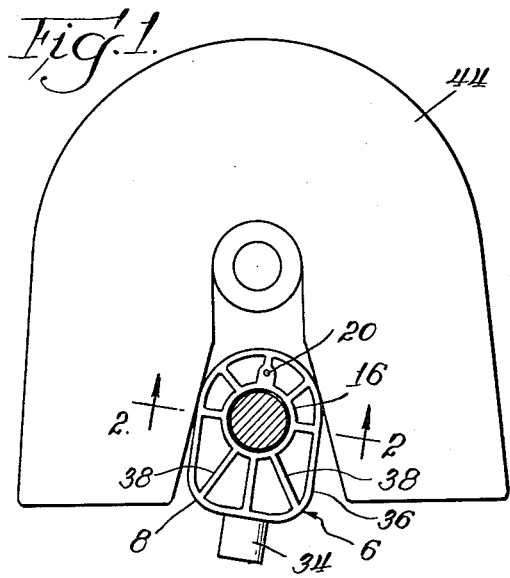
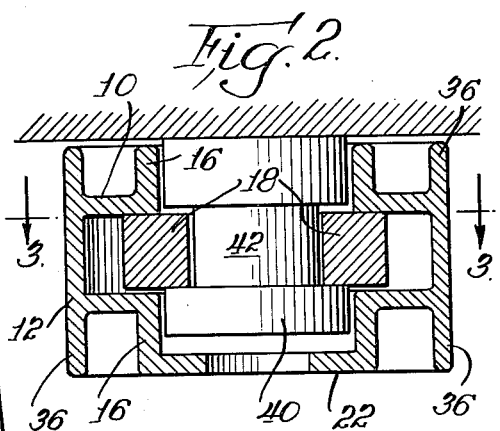
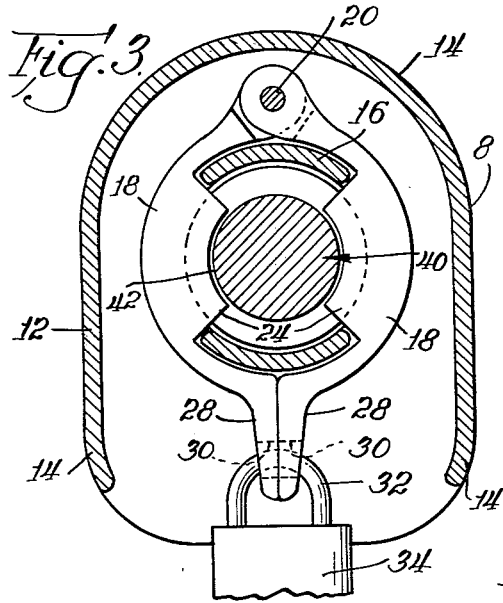
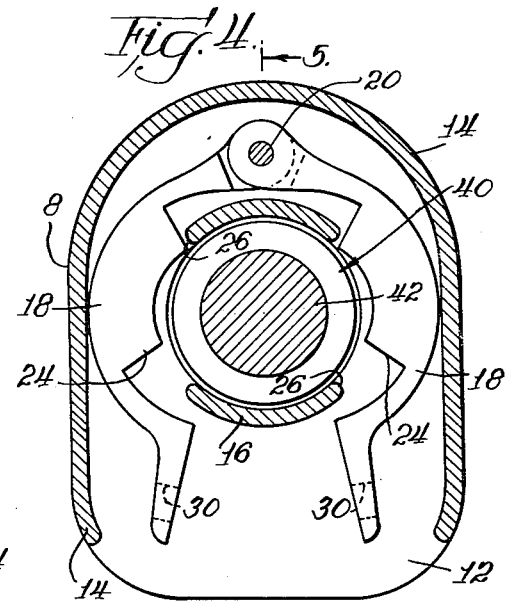
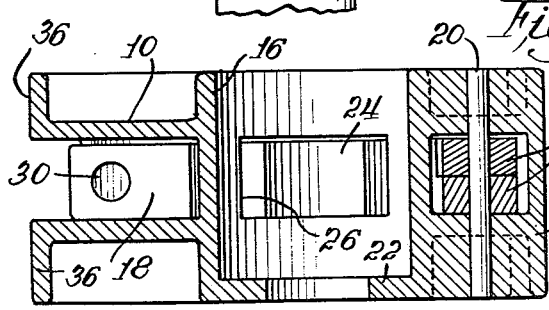
INVENTOR.
Duncan McIntyre
BY Stephen J. Rudy
atty.

United States Patent Office 3,112,636
Patented Dec. 3, 1963

3,112,636
TRAILER HITCH LOCKING MEANS
Duncan McIntyre, 3222 Plainfield Ave., Chicago 34, Ill., assignor of one-half to Mrs. Samuel Kurland, Skokie, Ill.
Filed Oct. 11, 1962, Ser. No. 229,793
4 Claims. (Cl. 70—232)

This invention relates to a locking means which is operable for prevention of hijacking a parked trailer by coupling a truck thereto.

In the trucking industry, which has assumed a role of increasing importance in the transportation, or carrier industry, it is common practice to park a trailer and remove the truck, or cab, for use otherwise. Such parked, and unattended trailers may be easily hijacked, that is, a truck is surreptitiously coupled to such a trailer and driven away to a place where the thief can unload the trailer and dispose, or otherwise make profit of the contents.

The present invention discloses a locking means which may be removably affixed to the coupling pin of a trailer, which makes it impossible to couple a truck to the trailer. In such manner, the danger of hijacking a parked and unattended trailer, by coupling a truck thereto and driving the trailer away, is eliminated. The locking means of the invention is exceedingly strong so that it cannot be bludgeoned off the trailer coupling pin, is useable on all standardized trailer coupling pins, and is unopenable without a proper key. In addition, the locking means provides a low cost means for effectively preventing hijacking of the trailer in the stated manner.

The main object of this invention is to provide a locking means which is operable for prevention of hijacking a parked trailer by coupling a truck thereto.

A further object is to provide a lock which cannot be bludgeoned off a trailer coupling pin.

Still another object is to provide a locking means which is useable on all standardized trailer coupling pins, and is unopenable without a proper key.

These and further objects and features of the invention will become more apparent from the following description and accompanying drawing wherein:

FIG. 1 is a plan view of a locking means as applied to a trailer coupling pin, and illustrating the impossibility of attaching a truck to the trailer coupling pin when the latter has said locking means affixed thereto;

FIG. 2 is an enlarged section view as seen through the locking means of FIG. 1 taken from line 2—2 therein;

FIG. 3 is a section view generally as seen from line 3—3 in FIG. 2, and showing a pair of jaw means in closed position;

FIG. 4 is the same as FIG. 3, but showing the jaw means in open position; and

FIG. 5 is a section view as seen from line 5—5 in FIG. 4, but with the locking means removed from the trailer coupling pin.

Referring now to the drawing, numeral 6 identifies a locking means embodying the principles of the invention, which lock includes a frame, or housing 8, preferably made of cast iron or steel, and including an upper platform 10, a lower platform 12 in parallel relation to the upper platform, a rib, or wall 14 extending about a major portion of the periphery and connecting the upper and lower platforms, and a cylindrical sleeve portion 16 arranged between the upper and lower platforms. A pair of jaw elements 18 are positioned in a space between the upper and lower platforms 10 and 12 respectively, said jaw elements being pivotally affixed to a pin 20 which is secured to the upper and lower platforms. The sleeve 16 is substantially enclosed at the lower end by a horizontal wall 22.

The jaw elements 18, which are identical in form, have integral arcuate projections 24 which are adapted to enter a pair of diametrically arranged openings 26 formed in the sleeve portion 16. A free swinging end 28 of each jaw element 18, is provided with a hole 30, which is adapted to receive the shackle or bow 32 of a padlock 34.

As best seen in FIGS. 1 and 2, both the upper and lower platforms 10 and 12, have a peripheral wall 36 arranged at a right angle thereto, and a plurality of ribs 38 extending radially from the sleeve portion 16 to the wall 36. Such a construction serves to provide a buffer wall as well as an exceedingly strong construction.

The locking means 6 is applied to a coupling pin 40 which projects downwardly from the forward end of the trailer (not shown), and which has an external diameter somewhat less than the sleeve portion 16. The pin 40, has a reduced diameter portion 42 which is made wide enough to receive the jaw element projections 24. In applying the locking means, the jaw elements 18 are swung apart, as seen in FIG. 4, and are swung together after the pin 40 is enclosed, as seen in FIGS. 2 and 3. The padlock 34 is then applied so that the jaw elements 18 are maintained in the reduced diameter portion 42, making it impossible to remove the locking means 6, from the coupling pin 40, without first removing the padlock. Since the shackle 32, and a goodly portion of the padlock are sheltered in the space between the upper and lower platforms 10 and 12, it will be extremely difficult, if not impossible, to cut or jimmy the padlock.

When the locking means 6 is on the coupling pin 40 of the trailer, it will not be possible to move a truck so that the flexure plate 44 of the fifth wheel thereof, may be moved into coupling position, as best seen in FIG. 1.

From the foregoing, it will be obvious that the locking means 6 will satisfy all of the objectives of the invention.

The foregoing description has been given in detail without thought of limitation since the inventive principles involved are capable of assuming other forms without departing from the spirit of the invention of the scope of the following claims.

What is claimed is:

1. A locking means for a trailer having a coupling pin comprising, a housing arranged to surround the trailer coupling pin, and movable jaw elements supported in the housing and arranged to maintain the housing in position on the trailer coupling pin, said jaw elements being arranged to receive a padlock whereby the jaws will be fixed in housing maintaining position.

2. A locking means for a trailer having a coupling pin comprising, a housing having platform means in parallel relation, and movable jaw elements pivotally supported between said platforms, said jaw elements being arranged to engage the coupling pin and maintain the housing in position on the trailer coupling pin, said jaw elements being arranged to receive a padlock whereby the jaws will be fixed against pivotal movement.

3. A locking means for a trailer having a coupling pin comprising, a housing having platform means in parallel relation, an integral sleeve portion extending between said platforms and having an internal diameter greater than the external diameter of the coupling pin, said sleeve portion being formed to provide openings in the wall thereof, and jaw members pivotally supported between said platforms, said jaw elements having arcuate projections which extend through the sleeve openings when the jaw members are in closed position, said jaw members being arranged to receive a padlock to maintain the jaw members in closed position.

4. A locking means according to claim 3, wherein said platform means include peripheral walls, and rib means extending between said walls and the sleeve portion.

References Cited in the file of this patent

UNITED STATES PATENTS

| | | |
|---|---|---|
| 1,764,367 | Szymanski | June 17, 1930 |
| 2,706,392 | Lucas et al. | Apr. 19, 1955 |
| 2,755,655 | Maffey | July 24, 1956 |
| 2,785,564 | Rossi | Mar. 19, 1957 |